W. S. GRAHAM.
CLUTCH FOR CORN PLANTERS.
APPLICATION FILED AUG. 19, 1908.

907,783.

Patented Dec. 29, 1908.

2 SHEETS—SHEET 2.

WITNESSES

INVENTOR
William S. Graham
by
Bond Adams, Pickard & Jackson
attys

UNITED STATES PATENT OFFICE.

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

CLUTCH FOR CORN-PLANTERS.

No. 907,783.  Specification of Letters Patent.  Patented Dec. 29, 1908.

Application filed August 19, 1908. Serial No. 449,344.

*To all whom it may concern:*

Be it known that I, WILLIAM S. GRAHAM, a citizen of the United States, residing at Canton, in the county of Fulton and State of Illinois, have invented certain new and useful Improvements in Clutches for Corn-Planters, of which the following is a specification, reference being had to the accompanying drawings.

My invention relates to improvements in clutches for corn planters of the type in which one clutch member is adapted to be driven continuously from the rear wheels of the planter, and the other clutch member is intermittently thrown into engagement with the first clutch member at each operation of the check-rower mechanism, and automatically thrown out of engagement when a predetermined amount of rotation of the seed plate has been effected.

The object of my invention is to provide a new and improved form of clutch for revolving the seed plates either continuously or intermittently.

Figure 1:
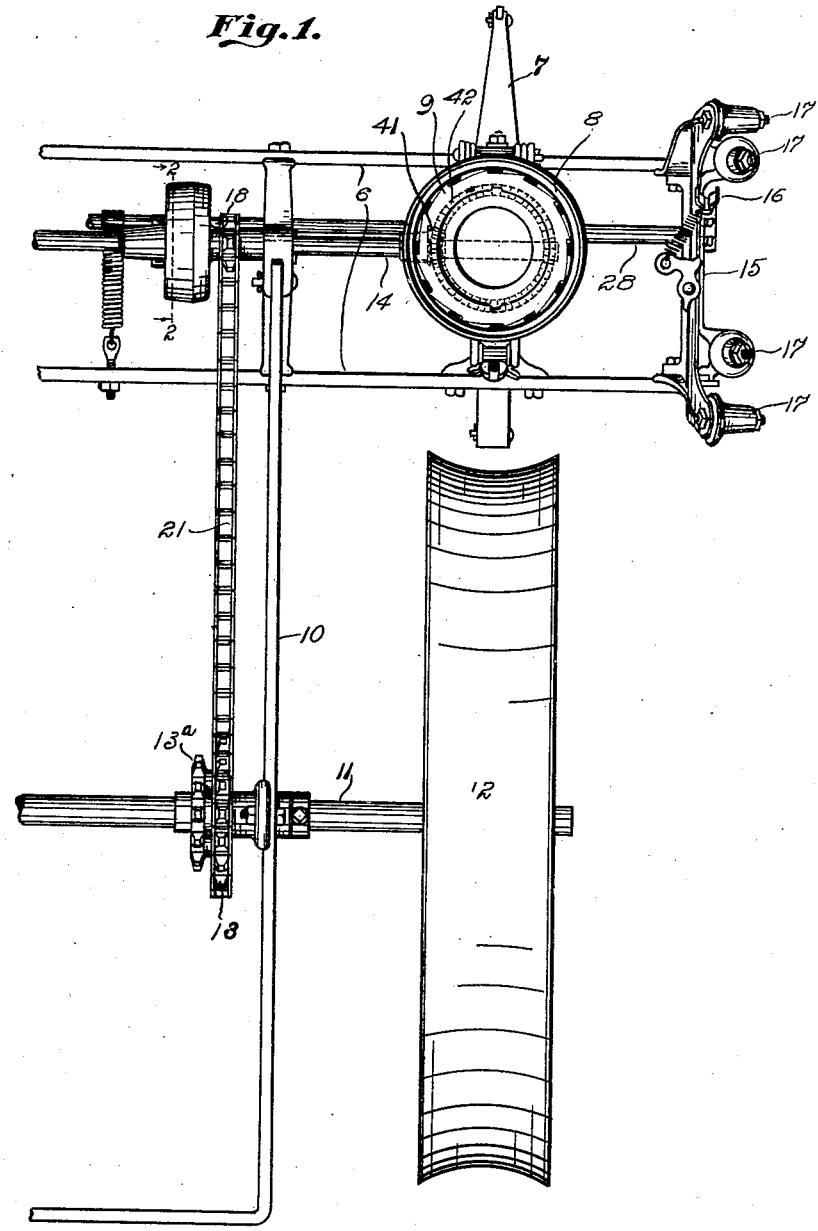
Figure 2:
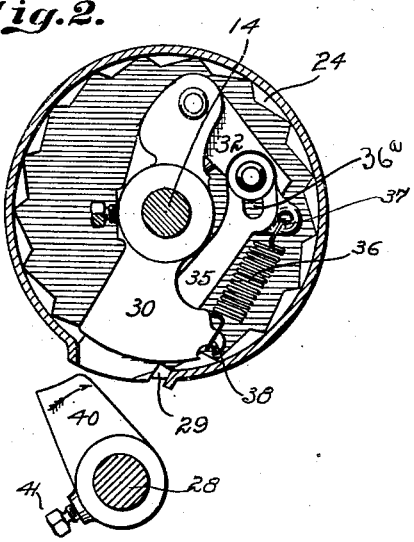
Figure 3:
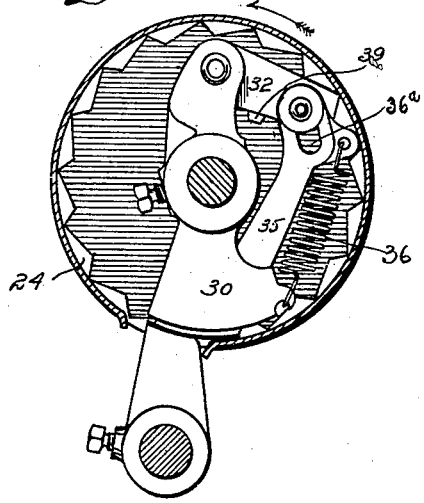
Figure 4:
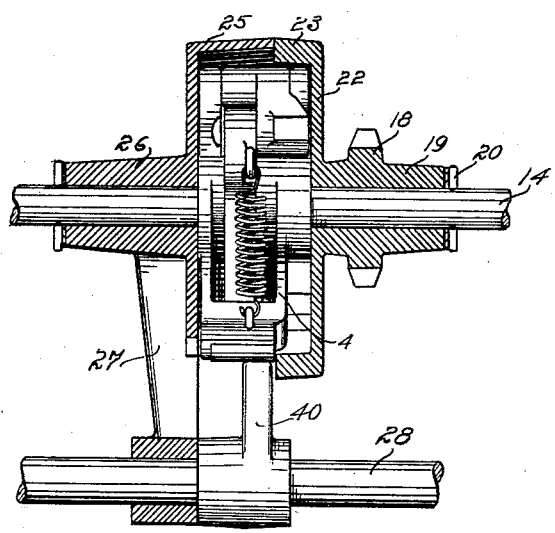
Figure 5:
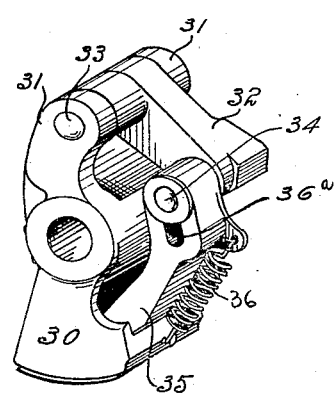

Referring to the drawings,—Figure 1 is a top or plan view of a portion of one-half of the corn planter. Fig. 2 is a section on line 2—2 of Fig. 1. Fig. 3 is the same as Fig. 2, showing the clutch member in engaged position. Fig. 4 is an end view of the parts shown in Figs. 2 and 3, shown from the left and partly in vertical section. Fig. 5 is a detail being an isometric view of the supporting block, dog, and actuating part of the clutch member.

In the drawings,—6 indicates the front or runner frame of the corn planter, provided with runners or furrow openers 7, seed-box 8 containing seed-plate 9, all of the usual form and description.

10 indicates a rear frame in which is journaled the axle or shaft 11, provided with the usual carrying wheels 12 upon its ends.

13—13ª indicate sprocket wheels which are keyed or otherwise secured to the shaft 11.

14 indicates the seed or operating shaft which is journaled on the front frame 6 in the usual manner.

15 indicates a head upon the end of the front frame and carrying fork-lever 16 and rollers 17, all of the usual form and description.

18 indicates a sprocket wheel which is revolubly mounted on the seed-shaft 14 by means of a hub 19, held against longitudinal movement by some suitable means, as cotter-pin 20.

21 indicates a sprocket chain which connects either of the sprocket wheels 13 or 13ª to the sprocket wheel 18.

22 indicates a disk which is preferably formed integral with the hub 19 of the sprocket wheel 18 and is provided with a flange 23, having upon its interior ratchet teeth 24, as is best shown in Figs. 2 and 3.

25 indicates a circular casing which is journaled upon the seed-shaft 14, having its open side edge bearing close against the inner edge of flange 23. The casing 25 is provided with a hub 26 from which extends downward a projecting arm 27 which is suitably bored to receive the rock-shaft 28 connected with and operated by the fork-lever 16 of the check-rower mechanism. The object of this arm 27 is to prevent the casing 25 from turning with the seed-shaft 14. The casing 25 is provided with an opening 29 in its side at its bottom, above the rock-shaft 28, as is best shown in Figs. 2, 3, and 4.

30 indicates a block which is suitably secured to the shaft 14, and whose bottom edge is rounded, as is best shown in Figs. 2 and 3, so as to travel around inside the casing 25.

31 indicates ears which project from the block 30.

32 indicates a dog which is pivoted between the ears 31 by means of a pin 33, and is adapted at its outer ends to engage with the ratchet teeth 24. The dog 32 is located to one side of the central vertical plane of the block 30, in register with the inner surface of flange 23 on disk 22.

34 indicates a pin which is secured to or formed integra with the dog 32 near its outer end projecting laterally therefrom into a position within the casing 25.

35 indicates a plunger which is provided at its upper end with a slot 36ª which engages the pin 34 supporting the plunger 35 therein. The other end of the plunger extends downward through a suitable opening in the block 30, and is of such length that when the parts are in position shown in Fig. 2, the lower end of the plunger will extend through the opening 29 beyond the interior periphery of the casing 25, as is best shown in Fig. 2. The lower end of this plunger, as is best shown in Figs. 2 and 3, is rounded to generally conform to the arc of the circle of the interior of the casing 25, so that when pushed inward as hereinafter described, it may ride around the interior of the casing.

36 indicates a spiral spring, one end of which is connected to a suitable lug, as 37, in the upper end of the plunger 35, and the other by a suitable hook 38 to the lower end of the block 30. The dog 32 is provided on its under side with a stop 39 which is adapted to rest upon the surface of the block between the ears 31, as is best shown in Fig. 2, and limit the downward motion of the said dog and plunger. The operation of the spiral spring is to normally and yieldingly hold the parts in the position shown in Fig. 2.

40 indicates a short arm which is secured to the rock-shaft 28 by a set screw 41, or in any other approved manner. The arm 40 is of such a length that when the rock-shaft is rocked by the check-rower mechanism, the arm 40, traveling in the direction shown by the arrow in Fig. 2 will be brought into contact with the lower end of the dog 32, forcing it inward into the position shown in Fig. 3, and carrying with it the dog 32 so that the engaging end of the dog comes into engagement with one or the other of the ratchet teeth 24 in the interior of the flange 23. As the plate 23 is being continuously rotated by means of the sprocket chain 21 and the sprockets 13 or 13ª and 18, the moment that the engaging end of the dog 32 comes into engagement with one of the ratchet teeth 24, as is best shown in Fig. 3, the block 30 will be carried around by this engagement, rotating the seed-shaft 14, and suitable gearing, as 41—42, being interposed, the seed-plate 8 will be rotated as long as the clutch members are engaging. Of course the arm 40 will be thrown back to its normal position by the operation of the rock-shaft, as soon as the fork-lever is released from a check-rower wire, but the dog 32 can not drop from the position into which it has been forced until one revolution has been completed. The lower end of the dog 32 rides around upon the inner surface of the casing 25 until the opening 29 is reached. Then the dog 32, drawn by the spring 36 drops down into its original position in the opening 29 and is ready for another operation. It will of course be understood that the gearing between the seed-plate and the seed-shaft 14 is so arranged that with each operation of the seed-shaft 14 by the clutch mechanism above described, the seed-plate will be given a definite predetermined portion of a rotation, causing the desired number of seed-cups, which are preferably of the single seed-cell type, to pass under a cut-off and over the usual discharge.

In the mechanism shown, where the seed-plate has 12 seed-cups, the gearing of the seed-plate to the shaft is as four to one, so that each revolution of the seed-shaft produces one-fourth of a revolution of the seed-plate, carrying three seed-cups under the cut-off and over the discharge. This of course may be varied, as will be readily understood, in any approved and ordinary manner.

When it is desired to use the machine as a drill instead of as a check-rower, the fork lever is tied back so as to bring the arm 40 into and retain it in the position shown in Fig. 3. This will prevent the plunger from dropping into the opening and releasing the dog. As the parts rotate, the lower end of the plunger rides over the top of the arm 40, and the clutch members will therefore be kept continuously in engagement, and the seed shaft, and consequently the seed-plate, will be continuously rotated for drilling the corn.

That which I claim as my invention, and desire to secure by Letters Patent, is,—

1. In a planter, the combination with a seed-plate, a seed-shaft, gearing between said seed-shaft and said seed-plate, a rock-shaft, check-rower mechanism for operating said rock shaft, of a clutch member rotatably mounted on said rock-shaft and having ratchet teeth, a casing journaled on said seed shaft, means for holding said casing against rotation with said seed-shaft, a block secured to said seed-shaft within said casing, a dog pivoted on said block and adapted to engage said ratchet teeth, a plunger mounted in said block connected with said dog and adapted when forced inward in said casing to effect an engagement between said dog and said ratchet teeth and to ride around in said casing, and means on said rock shaft adapted when the same is rocked to force said plunger inward.

2. In a planter, the combination with a seed-plate, a seed-shaft, gearing between said seed-shaft and said seed-plate, a rock-shaft, check-rower mechanism for operating said rock shaft, of a clutch member rotatably mounted on said rock-shaft and having ratchet-teeth, a casing journaled on said seed-shaft, means for holding said casing against rotation with said seed-shaft, a block secured to said seed-shaft within said casing, a dog pivoted on said block and adapted to engage said ratchet teeth, a plunger mounted in said block pivotally connected at one end with said dog and normally adapted to yieldingly hold said dog out of engagement with said ratchet teeth and when forced inward in said casing to effect an engagement between said dog and said ratchet teeth and ride around in said casing, and means on said rock-shaft adapted when the same is rocked to force said plunger inward.

3. In a planter, the combination with a seed-plate, a seed-shaft, gearing between said seed-shaft and said seed-plate, a rock-shaft, check-rower mechanism for operating said rock shaft, of a clutch member rotatably mounted on said rock-shaft and having ratchet teeth, a casing journaled on said seed-shaft, and provided with an opening, means for holding said casing against rotation with said seed-shaft, a block secured to said seed-shaft within said casing, a dog pivoted on said block and adapted to engage said ratchet teeth, a plunger mounted in said block pivotally connected at its inner end with said dog and normally spring-projected into said opening and adapted when forced inward in said casing to effect an engagement between said dog and said ratchet teeth and to ride around in said casing, and a projection on said rock-shaft adapted when the same is rocked to register with said opening and to force said plunger inward.

4. In a planter, the combination with a seed-plate, a seed-shaft, gearing between said seed-shaft and said seed-plate, a rock-shaft, check-rower mechanism for operating said rock-shaft, of a clutch member rotatably mounted on said rock-shaft and having ratchet teeth, a casing journaled on said seed-shaft, and provided with an opening, means for holding said casing against rotation with said seed-shaft, a block secured to said seed-shaft within said casing, a dog pivoted on said block and adapted to engage said ratchet teeth, a plunger mounted in said block pivotally connected at its inner end with said dog and adapted when forced inward to effect an engagement between said dog and said ratchet teeth and ride around in said casing, and a spring connecting said plunger and said block and adapted to normally yieldingly project the lower end of said plunger into said opening, and a projection on said rock-shaft adapted when the same is rocked to engage the lower end of said plunger and to project the same within said casing.

WILLIAM S. GRAHAM.

Witnesses:
  GILMAN ANDERSON,
  S. N. ARNOLD.